The present invention relates to surface heating units for cooking ranges, and more particularly to surface heating units having an imperforate or solid heating surface provided with an improved temperature sensing assembly for automatic temperature control systems.

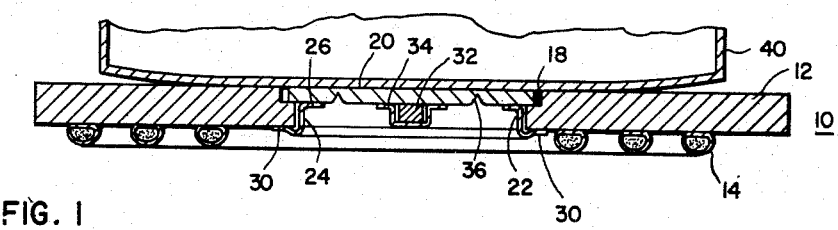
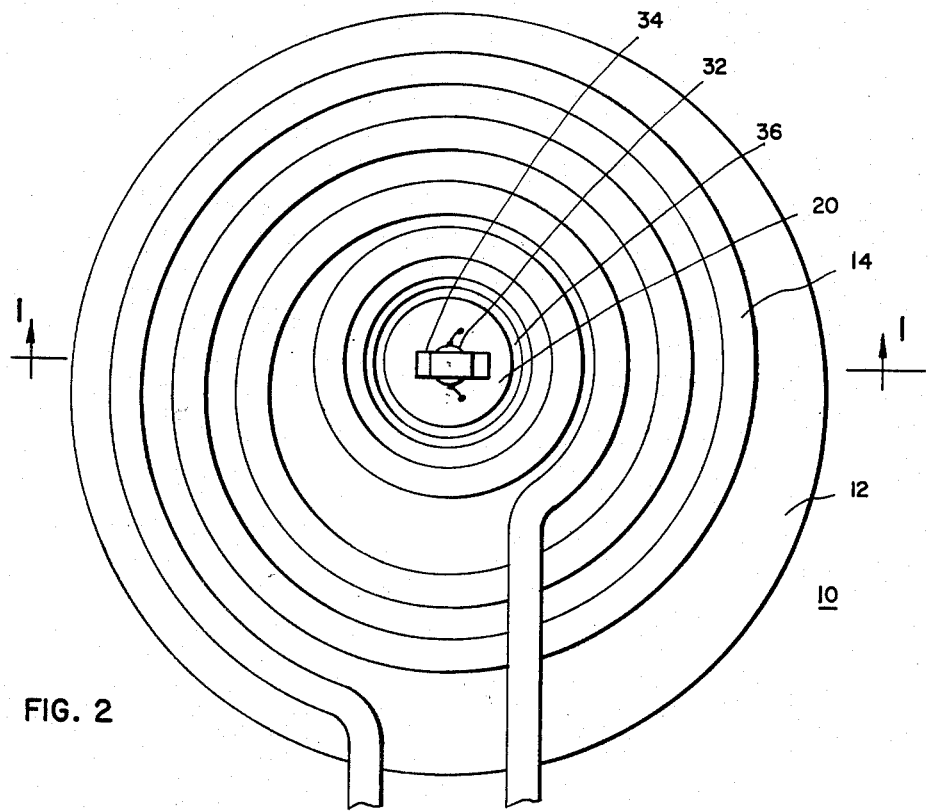
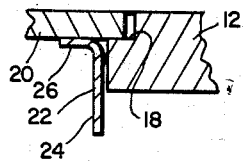
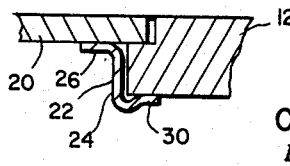
INVENTOR.
CHARLES H YOHE
BY
*Marvin M. Chaban*
ATTORNEY 3,191,003
SURFACE HEATING UNIT
Charles H. Yohe, Glen Ellyn, Ill., assignor to General Electric Company, a corporation of New York
Filed Dec. 21, 1961, Ser. No. 161,154
4 Claims. (Cl. 219—450)

Conventional surface cooking units are constructed with one or more resistance heating elements of the tubular sheathed conductor type, arranged in the form of a flat spiral. Such units of necessity have a continuous slot-like opening between adjacent convolutions, and an opening of rather large size at the center of the unit. A common complaint is that when foodstuffs boil over and drip through the spaces between the heating elements, the spillovers accumulate in the range space below the cooking top. To facilitate the clean-up operation, cooking units are hinged to the range cooking top, so that they may be swung upwardly to permit the removal of the reflector pan which is customarily below the heating elements, and thus afford space through which the housewife may pass her hand to clean the range space below. This arrangement, although standard on literally millions of electric cooking ranges, is inefficient at best; and in modern ranges in which the open center space of the cooking unit is partially occupied by a temperature responsive element forming part of an automatic cooking control, the cleaning operation is further complicated by the possibility of damaging the relatively fragile sensing device and the electrical leads connecting it with the temperature-responsive control system. A disclosure of a typical spiral element surface cooking unit with automatic temperature control will be found in U.S. Patent 2,822,455 issued on February 4, 1958 to R. J. Molyneaux et al.

Many workers in the art have proposed "solid top" surface cooking units in which a disc of metal or of vitreous material is in covering relation to the heating elements which are in heat transfer association therewith. The prior art also contains examples of solid top cooking units having sensing elements for temperature control; see, for example, Dickey U.S. Patent 2,552,480 granted May 8, 1951 for "Electrical Heating System." Said patent discloses means whereby the heat content of the heating unit is used for anticipatory effect to prevent overswings of temperature as the cooking vessel is being brought to its control temperature.

The present invention provides a solid top surface cooking unit equipped with temperature sensing means, and the invention is featured by providing means whereby the sensing element may have a covering member of high heat conductivity material regardless of the fact that such material may have a coefficient of expansion much greater than that of the covering plate or body of the heating unit.

Toward this end, the present invention provides a relatively thick annulus to the underside of which may be secured a continuous sheathed heating element. The annulus may be fabricated of suitable metal such as stainless steel or the like or may be fabricated from a temperature resistant glass or ceramic of the type sold under the name "Pyroceram." In another possible configuration, the sheathed heating element may be embedded within the annulus. In any event, the heating zone is generally in the shape of an annulus with a central unheated area. This unheated area is fully occupied by a thin circular sheet of material such as aluminum, which is corrosion resistant and has excellent thermal conductivity. This circular sheet or disc is mounted to be coplanar with the heated area, whereby there results a solid planar cooking surface which presents no openings through which drippings may penetrate to the area below the cooking surface. At the center of the underside of this thin disc there is affixed a device such as a thermistor for sensing the temperature of vessels being heated by the heating surface. The disc is in surface contact with the underside of vessels being heated to thermally react to the heating effect being imparted to the vessel and to transmit this reaction to the thermistor.

The construction may further include a metallic collar depending from and affixed to the disc near its circumference. This depending collar may be spun over and flanged about the underside of the heating annulus plate near its inner rim. This flanged collar performs a number of functions. First, it physically affixes the disc to the annulus inhibiting relative vertical motion while allowing relative lateral expansive and contractive motion of both the disc and the annulus. Further, the flanged collar acts to shield the thermistor from the effects of radiant heat emitted by the heating sheaths and by the annulus. Finally, the flange and disc combine by virtue of their connection to the annulus to receive a small proportion of the heat emitted by the heating annulus and to transfer this heat to the disc. The disc because of its low mass (due to its thin cross-section and relative small diameter) will respond rapidly to the heat received by conduction from the heating annulus and will be maintained at a higher temperature than the vessel being heated. This higher disc temperature will allow the disc to anticipate the heat levels of the vessel prior to the vessel reaching these levels and will so signify to the sensing thermistor. The thermistor will thereafter transmit this anticipated signal to a suitable control mechanism to shut down or suitably modulate the heat input. In this way, the anticipatory function normally required in conjunction with surface heating elements is performed inherently by the sensing disc construction and mounting, consequently no separate anticipating devices are necessary.

This invention therefore has as its object to provide a solid imperforate heating surface with a centrally located heat sensor, the construction of the surface performing inherently the functions of transmitting the thermal condition of a vessel being heated to the sensor, shielding the sensor from radiant heat transmitted directly from the heating elements and for providing anticipatory signals to the sensor of the thermal condition to be attained by the vessel.

It is a further object of the invention to provide a heat generating surface combined with a heat sensor in which the heating element comprises an annular heat transfer structure of comparatively thick cross-section and a central disc of comparatively thin cross-section to the underside of which is affixed the sensor; which construction allows the disc to receive and transmit indications of the thermal condition of an object being heated by the surface for transmission to the temperature sensor, and in which the disc receives conducted heat from the heating annulus to anticipate the thermal condition to be attained by the object being heated.

These objects, other objects, features and advantages of the invention will be apparent from the detailed description of a presently preferred embodiment thereof, read in conjunction with the accompanying drawings in which:

FIG. 1 shows a sectional elevation, taken on lines 1—1 of FIG. 2, of a surface heating unit employing my invention;

FIG. 2 shows a bottom plan view of the unit of FIG. 1;

FIG. 3 is an enlarged sectional view of the construction of the disc securing collar or cylinder before assembly to the annulus; and FIG. 4 is a view as FIG. 3 after assembly.

Shown in FIG. 1 is a heating unit 10 which comprises an annular plate 12. Annular plate 12 may be constructed of metal such as stainless steel or aluminum or may be constructed of a thermally resistant, ceramic material such as that known by the name "Pyroceram." When the plate is made of metal it may have a thickness of at least 3/16 inch; when the plate is made of a ceramic material the thickness will ordinarily be much greater, to provide the required structural rigidity. The plate 12 may have bonded to its lower surface in any suitable manner such as metal brazing or equivalent permanent securement, a sheathed heating element 14 of generally known design convoluted into a flat spiral. The illustrated heating element 14 includes a continuous helical resistance conductor housed within a metallic sheath. The conductor is spaced from the sheath by a compacted mass of suitable heat conductive, electrically insulating material such as powdered magnesium oxide. A ceramic annulus, where used in place of metal annulus 12, may receive the resistance conductors within a continuous groove in its undersurface, as is well known in the art; the actual type and arrangement of the heating element per se is not important to the present invention. In any event, the terminal ends of the heating element are arranged for connection to suitable leads (not shown) from a source of alternating current.

About the inner central rim of the annulus, a recessed shoulder 18 serves as an annular ledge on which a central circular disc 20 may be nested. Disc 20 is a metal disc which may be stainless steel, aluminum or other suitable metal preferably with good resistance to surface corrosion and heat transfer characteristics. The disc 20 in thickness should not be greater than one third of the thickness of the annulus 12 for optimum functioning. In the present application, the disc thickness may range from .020" to .050" depending on the material used and the annulus thickness. With greater disc thicknesses, the disc mass becomes too sluggish in its heat response characteristics and causes slow initial response and prolonged inertial responses to heat received by conduction from the annulus 12. This disc in diameter is but slightly smaller than the diametric shoulder dimension of the annulus central opening to minimize the resulting gap in the otherwise imperforate cooking surface while permitting thermal expansion of the disc relative to the annulus. To hold the disc in place with respect to the annulus there is provided a securing bracket 22 comprising a metallic cylinder or collar 24 having an inwardly extending flange 26. The flange 26 is brazed or suitably secured to the underside of disc 20. The cylindrical body structure 24 extends to below the bottom of annular plate 12 as shown in FIG. 3.

For assembly of the disc 20 to the annular plate 12, the disc is placed on shoulder 18. The lower extent of collar 24 may then be suitably machine spun over against the underside of annular plate 12 to generate the spun horizontal flange 30. This flange 30 is in at least line contact with the annulus 12 underside and suitably secures the disc 20 to the plate 12 in a vertical sense while allowing relative horizontal movement of the plate and disc responsive to thermal expansion and contraction.

Also physically secured to the underside of the disc at the center thereof is a temperature sensing device 32 which may be a thermistor. A thermistor, as is generally known is a semi-conductive device, the resistance of which varies in response to changes in temperature sensed by the thermistor. These resistance changes are transmitted electrically to a control circuit for adjusting the heat input accordingly. Most thermistors presently in use exhibit a negative temperature coefficient and respond inversely to temperature changes. Those skilled in the art are familiar with the several electrical circuits with which thermistors are now used for the control of surface cooking operations. The type of actual control is not important to the present invention.

To insure a good thermal contact between the sensing portion of the thermistor and the underside of the disc, a suitable bracket 34 may be used to cup the thermistor tightly against the disc surface. The bracket 34 may be fabricated from any material having inherent springlike qualities for maintaining the thermistor 32 sensing surface in contact with disc 20. In this way the sensing device 32 will sense and respond to temperature changes at the disc upper surface and will transmute these thermal changes into electrical changes for transmission to the control circuit.

The structure 40 resting on the solid heating surface provided by the combined annulus and disc in FIG. 1, is representative of a cooking pot or the like. The vessel 40 is in direct heat transfer relation with both the annulus 12 and the disc 20. The disc temperature is largely the result of heat transfer from the bottom of the pot, and to a lesser degree the result of heat transfer from the adjacent annulus 12. The temperature of the thermistor 32 lags slightly behind the temperature of the cooking vessel 40, because of heat conduction losses, radiation, and the like. However, the temperature of the foodstuff within the pot 40 lags behind the temperature of the pot, and the sensor 32 is, therefore, quite representative of the foodstuff temperature. Obviously, it is this latter temperature which is of primary importance in controlling a cooking operation.

The secondary transmission of heat from the annulus 12 to the disc 20 elevates the disc temperature slightly above that of the vessel lower surface to perform a temperature anticipating function.

The use of anticipators in thermal sensing of the heating of large mass objects is quite well known. Normally, this anticipating function is provided by utilizing a secondary sensor heater for elevating the temperature of the sensor above that of the object being heated. This slight added elevation of the sensor above that of the vessel lower surface allows the sensor to act and respond to a specific temperature level before that level is actually reached by the vessel. By this premature response, the current to the heating element may be modulated or shut off before the vessel reaches the control temperature. This is particularly desirable in heating units of the solid top type, for such units have a relatively large "heat inertia," and will continue to transfer heat to the vessel even though the actual heat source may be interrupted or substantially reduced. This continued heating effect results in what is known in the art as an "overshoot" of temperature, and has been one of the factors most adverse to automatic control of cooking operations. Nevertheless, this secondary heating of the sensor must be small, relative to the heating derived from the cooking vessel itself. I have found that heat conduction from the annulus 12 to the disc 20 may be controlled by the thickness of the disc 20, or the material of the disc—for example, stainless steel is a poorer conductor of heat than aluminum. In situations where structural requirements demand a relatively heavy disc, the heat flow to the area thereof occupied by the sensor may be isolated by means of grooves 36 arranged in concentric or other appropriate pattern to provide thin metal areas which limit heat conduction without detracting from structural strength or physical stability of the disc.

The heat reflection effect of the depending cylindrical body 26 shields the sensor 32 from heat energy radiated from the adjacent annulus 12. This makes it possible to substantially eliminate a variable, as respects the heating of the disc 20 and sensor 32, and thus to rely on controlled heat conduction to accomplish the secondary heating effect essential for anticipatory control purposes.

A feature of additional value resulting from the mechanism of the sensing disc 20 and its mounting means derives from the comparative freedom for expansion permitted the disc 20. This is particularly important in surface unit constructions in which the annulus 12 is of a ceramic material having substantially zero coefficient of expansion. The present mechanism accommodates the expansion of the disc with no possibility of upward distortion which, in extreme cases, could physically lift the cooking vessel from good heat transfer relation with the annulus.

While there has been described what is at present thought to be a preferred embodiment of the invention, it will be understood that various modifications may be made therein, and it is the intention to cover by the appended claims, all such modifications as fall within the true spirit and scope of the invention.

What is claimed is:

1. A substantially imperforate surface heating unit comprising an outer annulus of comparatively thick heat conductive material,
   an inner disc of good heat conductive material in direct heat exchange engagement with the inner periphery of said annulus and fully occupying the opening of said annulus whereby said disc and annulus jointly form a solid planar surface of heat conductive material for the support of a cooking vessel,
   the thickness of said disc being only a relatively small fraction of the thickness of said annulus,
   a resistance heating element disposed about the annulus below said supporting surface in good heat transfer relation therewith whereby heat may be conducted to said vessel and from said vessel to said disc,
   a thermistor mounted on said disc in good heat transfer relation therewith,
   said thermistor occupying only a small central portion thereof,
   and means providing for lateral expansion and contraction of said disc relative to said annulus while maintaining said direct heat transfer engagement with said annulus under all operating conditions of said unit.

2. A surface heating unit comprising:
   an outer annulus,
   a resistance heating element affixed to said annulus for conduction of heat from said element to said annulus,
   a disc occupying the opening of said annulus to combine therewith to provide a solid circular heating surface, said disc having a relatively small peripheral portion in heat transfer contact with the wall defining said opening,
   a heat sensor secured to the underside of said disc for approximately sensing the temperature of an object being heated on said surface and contacting said disc,
   and means for affixing said disc to said annulus,
   said means including a flanged collar depending from said disc to a level below said annulus,
   said means shielding said disc from the radiation of heat from said element and said annulus whereby said sensor is primarily thermally responsive to heat conductively received from said disc.

3. A surface heating unit comprising:
   an outer annulus,
   a sheathed heating element bonded to said annulus for conduction of heat from said element to said annulus,
   a disc fitted in the central opening of said annulus to combine therewith to provide a solid circular heat generating surface,
   a heat sensor secured to the underside of said disc for sensing the temperature of an object being heated on said surface and contacting said disc,
   means for securing said disc against vertical movement within said opening,
   said securing means allowing relative lateral movement of said disc and annulus responsive to thermal expansion and contraction,
   said securing means comprising a flanged collar depending from said disc,
   said collar circumjacent said sensor,
   a flange of said collar parallel to said heating surface below said annulus and in contact with said annulus,
   said collar and flange interceptive of heat radiating from said annulus toward the central opening and conductive of a portion of said intercepted heat to said disc,
   said collar thereby shielding said sensor from said radiated heat.

4. A heating unit comprising:
   a flat annular structure having a plane surface on which to place an object to be heated, the wall of said structure defining the annular opening having a continuous shoulder,
   means for heating said annulus to desired temperature,
   a disc of good heat transfer material occupying said annular opening, the periphery of said disc engaging with said shoulder for heat transfer relative thereto and said disc being coplanar with said annular structure so as to provide therewith a substantially continuous plane surface for the support of the object to be heated,
   a temperature sensing device fixed to the underside of said disc in heat transfer relation therewith,
   and means for securing said disc to said annular structure and shielding said sensing device from heat energy radiated from surrounding wall surfaces of said annular structure.

References Cited by the Examiner

UNITED STATES PATENTS

| 2,140,479 | 12/38 | Myers et al. | 219—450 |
| 2,715,176 | 8/55 | Schoberle | 219—450 |
| 2,882,379 | 4/59 | Long | 219—452 |

FOREIGN PATENTS

| 213,519 | 2/61 | Austria. |

RICHARD M. WOOD, *Primary Examiner.*

MAX L. LEVY, *Examiner.*